United States Patent
Castellino et al.

(10) Patent No.: US 10,105,682 B2
(45) Date of Patent: Oct. 23, 2018

(54) CATALYZED CERAMIC CANDLE FILTER AND METHOD FOR CLEANING OF OFF- OR EXHAUST GASES

(71) Applicant: HALDOR TOPSØE A/S, Kgs. Lyngby (DK)

(72) Inventors: Francesco Castellino, Birkerød (DK); Lars Storm Pedersen, Kgs. Lyngby (DE)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 15/545,499

(22) PCT Filed: Mar. 20, 2015

(86) PCT No.: PCT/EP2015/055952
§ 371 (c)(1),
(2) Date: Jul. 21, 2017

(87) PCT Pub. No.: WO2016/150465
PCT Pub. Date: Sep. 29, 2016

(65) Prior Publication Data
US 2018/0008964 A1 Jan. 11, 2018

(51) Int. Cl.
| | |
|---|---|
| *B01J 23/44* | (2006.01) |
| *B01D 53/86* | (2006.01) |
| *B01D 53/94* | (2006.01) |
| *B01J 23/02* | (2006.01) |
| *B01J 23/22* | (2006.01) |
| *F01N 3/10* | (2006.01) |
| *F01N 3/035* | (2006.01) |
| *B01J 35/06* | (2006.01) |
| *B01J 35/00* | (2006.01) |
| *F01N 3/20* | (2006.01) |
| *F01N 13/00* | (2010.01) |
| *B01J 23/648* | (2006.01) |
| *F01N 3/022* | (2006.01) |
| *B01J 37/02* | (2006.01) |
| *B01J 35/04* | (2006.01) |

(52) U.S. Cl.
CPC ............ *B01J 23/44* (2013.01); *B01D 53/865* (2013.01); *B01D 53/8643* (2013.01); *B01D 53/8656* (2013.01); *B01D 53/944* (2013.01); *B01D 53/9418* (2013.01); *B01D 53/9463* (2013.01); *B01D 53/9468* (2013.01); *B01D 53/9472* (2013.01); *B01J 23/02* (2013.01); *B01J 23/22* (2013.01); *B01J 23/6482* (2013.01); *B01J 35/0006* (2013.01); *B01J 35/0066* (2013.01); *B01J 35/06* (2013.01); *B01J 37/0211* (2013.01); *B01J 37/0234* (2013.01); *F01N 3/0222* (2013.01); *F01N 3/035* (2013.01); *F01N 3/103* (2013.01); *F01N 3/106* (2013.01); *F01N 3/2066* (2013.01); *F01N 13/009* (2014.06); *B01D 2255/1023* (2013.01); *B01D 2255/20707* (2013.01); *B01D 2255/20723* (2013.01); *B01D 2255/904* (2013.01); *B01D 2255/9032* (2013.01); *B01D 2255/9045* (2013.01); *B01D 2255/9155* (2013.01); *B01D 2257/404* (2013.01); *B01D 2257/502* (2013.01); *B01D 2257/702* (2013.01); *B01D 2257/708* (2013.01); *B01D 2258/01* (2013.01); *B01D 2258/0233* (2013.01); *B01D 2258/0241* (2013.01); *B01D 2258/0283* (2013.01); *B01D 2258/0291* (2013.01); *B01J 35/04* (2013.01); *B01J 2523/00* (2013.01); *F01N 2370/02* (2013.01); *F01N 2510/068* (2013.01); *Y02T 10/24* (2013.01)

(58) Field of Classification Search
CPC ...... B01D 46/00; B01D 53/565; B01D 53/72; B01D 53/62; B01D 53/86; B01D 53/8631; B01D 53/8643; B01D 2239/04; B01D 2239/0407; B01D 2239/045; B01D 2239/0464; B01D 2239/0478; B01D 2239/065; B01D 2255/1023; B01D 2255/915; B01D 37/02; B01D 37/025; B01D 29/0065
See application file for complete search history.

(56) References Cited

U.S. PATENT DOCUMENTS

| | | | | |
|---|---|---|---|---|
| 2018/0008964 A1* | 1/2018 | Castellino | ................. | B01J 23/44 |
| 2018/0008965 A1* | 1/2018 | Thogersen | ............... | B01J 23/44 |

FOREIGN PATENT DOCUMENTS

| | | | | |
|---|---|---|---|---|
| CA | 2 976 140 A1 * | 9/2016 | .......... | B01J 23/6482 |
| EP | 1 493 484 A1 | 1/2005 | | |

(Continued)

OTHER PUBLICATIONS

International Search Report (PCT/ISA/210) dated May 4, 2015, by the European Patent Office as the International Searching Authority for International Application No. PCT/EP2015/055952.

(Continued)

*Primary Examiner* — Timothy C Vanoy
(74) *Attorney, Agent, or Firm* — Buchanan Ingersoll & Rooney P.C.

(57) ABSTRACT

Ceramic candle filter and use of the filter in the removal of particulate matter in form of soot, ash, metals and metal compounds, together with hydrocarbons and nitrogen oxides being present in process off-gas or engine exhaust gas, the filter comprises a combined SCR and oxidation catalyst arranged at least on the dispersion side and/or within wall of the filter, the combined SCR and oxidation catalyst comprises palladium, a vanadium oxide and titania.

7 Claims, No Drawings

(56) References Cited

FOREIGN PATENT DOCUMENTS

| GB | 2 514 177 A | 11/2014 |
| WO | WO 90/13352 A1 | 11/1990 |
| WO | WO 98/03249 A1 | 1/1998 |
| WO | WO 2014/063738 A1 | 5/2014 |
| WO | WO 2016/150464 | 9/2016 |
| WO | WO 2016/150523 | 9/2016 |

OTHER PUBLICATIONS

Written Opinion (PCT/ISA/237) dated May 4, 2015, by the European Patent Office as the International Searching Authority for International Application No. PCT/EP2015/055952.

International Search Report (PCT/ISA/210) dated May 4, 2015, by the European Patent Office as the International Searching Authority for International Application No. PCT/EP2015/055951.

Written Opinion (PCT/ISA/237) dated May 4, 2015, by the European Patent Office as the International Searching Authority for International Application No. PCT/EP2015/055951.

International Search Report (PCT/ISA/210) dated Nov. 6, 2015, by the European Patent Office as the International Searching Authority for International Application No. PCT/EP2015/059192.

Written Opinion (PCT/ISA/237) dated Nov. 6, 2015, by the European Patent Office as the International Searching Authority for International Application No. PCT/EP2015/059192.

\* cited by examiner

CATALYZED CERAMIC CANDLE FILTER AND METHOD FOR CLEANING OF OFF- OR EXHAUST GASES

The present invention relates to ceramic candle filters and a method for cleaning of off- or exhaust gases. More particularly, the invention provides a catalyzed ceramic candle filter for the removal of dust and particulate matter in a process gas and harmful components contained in the process gas. The catalyzed ceramic candle filter is in particular useful in the cleaning of process or raw gas from industrial processes involving combustion, like the production of minerals, glass, cement, waste incineration, or from coal fired boilers and engines.

Ceramic filters in form of filter candles are used in many industries for removal of particulate matter from process gases. They are one of the most efficient types of dust collectors available and can achieve collection efficiencies of more than 99% for particulates. The filters can be made from various ceramic materials comprising ceramic fibres made of alkali and alkaline earth silicates, or alumino silicates.

The high particulate removal efficiency of ceramic candle filters is partly due to the dust cake formed on the surfaces of the candle filter and partly due to the candle filter composition and porosity. In order to provide sufficient filtration activity and an acceptable low pressure drop over the filter conventional ceramic candle filters have a porosity of between 70 and 90%. The wall thickness of those filters should be in the range of 10-20 mm for sufficient stability and mechanical strength.

Particle-containing process off-gas and engine exhaust gas often contains a plurality of pollutants, e.g. $NO_x$, volatile organic compounds (VOC), $SO_2$, CO, $NH_3$, dioxins and furans, in concentrations that have to be reduced depending on local legislation. For this purpose, several conventional methods are available. The abatement of gaseous contaminants like $NO_x$, VOC, dioxins and furans can be effectively carried out by contact with a catalyst. In particular, vanadium oxide-based catalysts are commonly used catalysts for $NO_x$ reduction by selective reduction of $NO_x$ with $NH_3$ in stationary and automotive applications.

This catalyst is active both in the oxidative removal of hydrocarbons (VOC) and in the selective catalytic reduction (SCR) of NOx by reaction with $NH_3$.

In comparison to the precious metal catalysts, like the Pd catalyst, the vanadium oxide catalyst is less selective in the formation of $CO_2$ and some amounts of CO are produced during the oxidation reactions. CO cannot be oxidized to $CO_2$ at a feasible reaction rate by contact with the vanadium oxide catalyst.

We have found that when providing the candle filter with a catalyst comprising both vanadium oxide and palladium results in an effective oxidation of hydrocarbons and soot together with ammonia-SCR of NOx and a lower slip of ammonia and carbon monoxide from the filter.

Pursuant to this finding, the present invention provides a ceramic candle filter suitable for the removal of particulate matter in form of soot, ash, metals and metal compounds, together with hydrocarbons and nitrogen oxides being present in process off-gas or engine exhaust gas, the filter comprises a combined SCR and oxidation catalyst arranged at least on the dispersion side and/or within wall of the filter, the combined SCR and oxidation catalyst comprises palladium, a vanadium oxide and titania.

The terms "dispersion side" and "permeate side" as used herein refer to the flow side of the filter facing the unfiltered exhaust gas and to flow side facing the filtered off- or exhaust gas, respectively.

The invention provides additionally a method for the removal of particulate matter in form of soot, ash, metals and metal compounds, together with hydrocarbons and nitrogen oxides being present in process off-gas or engine exhaust gas, comprising the steps of providing a process off-gas or engine exhaust gas containing a nitrogenous reductant or adding the nitrogenous reductant to the off- or exhaust gas;

passing the off-gas or the exhaust through a ceramic candle filter and capturing the particulate matter; and reducing amounts of soot in the particulate matter captured on the at least one particulate filter and reducing amounts of nitrogen oxides and hydrocarbons in the off- or exhaust gas by oxidation of the hydrocarbons and by selective catalytic reduction (SCR) of the nitrogen oxides with the nitrogenous reductant in contact with a combined SCR and oxidation catalyst being arranged on the dispersion side and/or within wall of the filter, wherein the combined SCR and oxidation catalyst comprises palladium, a vanadium oxide and titania.

The term "a vanadium oxide" or "vanadium oxide" refers to:

Vanadium(II)oxide (vanadium monoxide), VO; or vanadium(III)oxide (vanadium sesquioxide or trioxide), $V_2O_3$; or vanadium(IV)oxide (vanadium dioxide), $VO_2$; or vanadium(V)oxide (vanadium pentoxide), $V_2O_5$.

Preferably, vanadium oxide for use in the invention comprises or consists of vanadium(V)oxide (vanadium pentoxide), $V_2O_5$.

The term "titania" refers to titanium dioxide ($TiO_2$).

The catalytically active form of palladium is palladium in the metallic and/or oxidic form.

The shortage Pd/V/Ti shall mean a catalyst consisting of palladium, a vanadium oxide and titania.

The Pd/V/Ti catalyst has i) dual functionality (removal of NOx and removal of VOC, volatile organic compounds); ii) a S-tolerance; and iii) a lower $SO_2$ oxidation activity compared to other catalyst compositions, e.g. Pt-based catalysts.

When employing a Pd/V/Ti catalyst the catalyzed filter candles are sulfur resistant, i.e. not subjected to sulfur deactivation. The Pd/V/Ti catalyst additionally reduces the amount of $SO_3$ formed by oxidation of $SO_2$. If $H_2S$ is also present in the process gas entering the filter, it will also be oxidized to $SO_2$ on the Pd/V/Ti catalyst.

The catalytically active material may be applied on the ceramic filter by impregnation with a slurry containing the catalytically active material in form of titania microparticles and the precursors of the active materials, i.e. salts of vanadium and palladium. Once impregnated, the filter is subsequently dried and heated up to the required temperature for the decomposition of all precursors and activation of the catalyst.

Compared to monolithic formed filters or wall flow filters, the effective gas contact between the palladium metal particles and reactants in gas is much higher, which results in a much reduced amount of palladium necessary to obtain a reasonable oxidation activity.

Typically, the catalyst employed in the invention the catalyst contains palladium in an amount of between 20 and 1000 ppm/weight of the filter, preferably less than 200 ppm/weight.

In the case of high temperature ceramic filters several types of fibers may be used for their production. These can be constituted e.g. by silica-aluminate and calcium-silicates fibers, or a mixture thereof.

Other preferred ceramic fibres comprise bio-soluble fibres selected from the group of calcium-magnesium-silicates.

The invention claimed is:

1. A ceramic candle filter suitable for the removal of particulate matter in form of soot, ash, metals and metal compounds, together with hydrocarbons and nitrogen oxides being present in process off-gas or engine exhaust gas, the filter comprises a combined SCR and oxidation catalyst arranged at least on the dispersion side and/or within wall of the filter, the combined SCR and oxidation catalyst comprises palladium, a vanadium oxide and titania, wherein the ceramic material of the filter is selected from the group of silica-aluminate, calcium-magnesium-silicates, calcium-silicates fibers, or a mixture thereof.

2. The ceramic candle filter of claim 1, wherein the catalyst contains palladium in an amount of between 20 and 1000 ppm/weight of the filter.

3. The ceramic candle filter according to claim 1, wherein the ceramic material of the filter consists of bio-soluble fibres selected from the group of calcium-magnesium-silicates.

4. A method for the removal of particulate matter in form of soot, ash, metals and metal compounds, together with hydrocarbons and nitrogen oxides being present in process off-gas or engine exhaust gas, comprising the steps of
providing a process off-gas or engine exhaust gas containing a nitrogenous reductant or adding the nitrogenous reductant to the off- or exhaust gas;
passing the off-gas or the exhaust through a ceramic candle filter and capturing the particulate matter; and
reducing amounts of soot in the particulate matter captured on the at least one particulate filter and reducing amounts of nitrogen oxides and hydrocarbons in the off- or exhaust gas by oxidation of the hydrocarbons and by selective catalytic reduction (SCR) of the nitrogen oxides with the nitrogenous reductant in contact with a combined SCR and oxidation catalyst being arranged on the dispersion side and/or within wall of the filter, wherein the combined SCR and oxidation catalyst comprises palladium, a vanadium oxide and titania.

5. The method according to claim 4, wherein combined oxidation and SCR catalyst contains palladium in an amount of between 20 and 1000 ppm/weight of the filter.

6. The method of claim 4, wherein the ceramic material of the filter is selected from silica-aluminate, calcium-magnesium-silicates, calcium-silicates fibers, or a mixture thereof.

7. The method according to claim 4, wherein the ceramic material of the filter comprises bio-soluble fibres selected from the group of calcium-magnesium-silicates.

\* \* \* \* \*